US 6,760,070 B1

United States Patent
Merrill et al.

(10) Patent No.: US 6,760,070 B1
(45) Date of Patent: Jul. 6, 2004

(54) HIGH-SENSITIVITY STORAGE PIXEL SENSOR ARRAY HAVING AUTO-EXPOSURE DETECTION

(75) Inventors: Richard B. Merrill, Woodside, CA (US); Richard M. Turner, Menlo Park, CA (US); Milton B. Dong, Saratoga, CA (US); Richard F. Lyon, Los Altos, CA (US)

(73) Assignee: Foveon, Inc., Santa Clara, CA (US)

( * ) Notice: Subject to any disclaimer, the term of this patent is extended or adjusted under 35 U.S.C. 154(b) by 0 days.

(21) Appl. No.: 09/527,107

(22) Filed: Mar. 16, 2000

Related U.S. Application Data

(62) Division of application No. 09/515,807, filed on Feb. 29, 2000.

(51) Int. Cl.[7] .......................... H04N 5/335; H01L 27/00
(52) U.S. Cl. ...................... 348/294; 348/300; 348/302; 348/308; 250/208.1
(58) Field of Search ................................ 348/294, 300, 348/301, 302, 308; 257/291, 292, 293; 250/208.1

(56) References Cited

U.S. PATENT DOCUMENTS

| 3,866,067 A | 2/1975 | Amelio ........................ 307/311 |
| 3,934,161 A | 1/1976 | Caywood ..................... 307/311 |
| 3,971,065 A | 7/1976 | Bayer ........................... 358/41 |

(List continued on next page.)

FOREIGN PATENT DOCUMENTS

| DE | 43 04 506 A1 | 8/1994 | .......... H04N/5/225 |
| DE | WO 96/15626 | 5/1996 | .......... H04N/5/335 |
| DE | WO 97/17800 | 5/1997 | .......... H04N/3/143 |
| DE | WO 98/19455 | 5/1998 | ............ H04N/3/15 |
| DE | 198 36 356 A1 | 5/1999 | .......... H01L/27/146 |
| DE | WO 99/66560 | 12/1999 | .......... H01L/27/144 |
| DE | WO 99/66712 | 12/1999 | ............ H04N/3/15 |
| DE | WO 00/72604 A1 | 11/2000 | ............ H04N/9/04 |

(List continued on next page.)

OTHER PUBLICATIONS

Electrically Erasable and Reprogrammable Read–Only Memory Using the n–Channel SIMOS One–Transistor Cell; IEEE Transactions on Electron Devices, vol. ED–24, No. 5, May 1977, Bernward Rossler.

(List continued on next page.)

Primary Examiner—Wendy R. Garber
Assistant Examiner—Luong Nguyen
(74) Attorney, Agent, or Firm—Sierra Patent Group, Ltd.

(57) ABSTRACT

An integrated active pixel sensor array arranged in a plurality of rows and columns comprises a saturation level line coupled to a source of saturation level control voltage, a global current-summing node. A plurality of active pixel sensors is disposed in the array, each pixel sensor associated with one row and one column of the array and including a photodiode having a first terminal coupled to a first potential and a second terminal, a reset transistor having a first terminal coupled to the second terminal of the photodiode, a second terminal coupled to a reset reference potential that reverse biases the photodiode, and a control gate coupled to the reset line, a photocharge integration node coupled to the second terminal of the photodiode, the photocharge integration node comprising the gate of a first source-follower transistor, the first source-follower transistor having a drain, coupled to a first source-follower drain line, and a source, a circuit for generating a bias current at the source of the first source follower transistor, and an exposure transistor having a source coupled to the source of the first source-follower transistor, a drain coupled to the global current-summing node and a control gate coupled to the saturation level line.

27 Claims, 4 Drawing Sheets

U.S. PATENT DOCUMENTS

| | | | |
|---|---|---|---|
| 3,988,619 A | 10/1976 | Malaviya | 307/311 |
| 4,011,016 A | 3/1977 | Layne et al. | 356/195 |
| 4,236,760 A | 12/1980 | Haar et al. | 303/6 C |
| 4,238,760 A | 12/1980 | Carr | 357/30 |
| 4,309,604 A | 1/1982 | Yoshikawa et al. | 250/226 |
| 4,363,963 A | 12/1982 | Ando | 250/211 |
| 4,473,836 A | 9/1984 | Chamberlain | 357/30 |
| 4,499,529 A | 2/1985 | Figueroa | 362/283 |
| 4,499,590 A | 2/1985 | Bluzer | 377/60 |
| 4,573,077 A | 2/1986 | Imai | 358/212 |
| 4,613,895 A | 9/1986 | Burkey et al. | 358/41 |
| 4,626,915 A | 12/1986 | Takatsu | 358/213 |
| 4,651,001 A | 3/1987 | Harada et al. | 250/330 |
| 4,654,714 A | 3/1987 | Hurst, Jr. et al. | 358/213 |
| 4,677,289 A | 6/1987 | Nozaki et al. | 250/226 |
| 4,704,633 A | 11/1987 | Matsumoto | 358/213.27 |
| 4,734,776 A | 3/1988 | Wang et al. | 358/213.31 |
| 4,742,238 A | 5/1988 | Sato | 250/578 |
| 4,786,818 A | 11/1988 | Mead et al. | 250/578 |
| 4,809,075 A | 2/1989 | Akimoto et al. | 358/213.18 |
| 4,839,735 A | 6/1989 | Kyomasu et al. | 358/213.31 |
| 4,845,553 A | 7/1989 | Konomura et al. | 358/98 |
| 4,875,091 A | 10/1989 | Yamada et al. | 358/42 |
| 4,901,129 A | 2/1990 | Hynecek | 357/30 |
| 4,942,473 A | 7/1990 | Zeevi et al. | 358/213.26 |
| 5,014,107 A | 5/1991 | Vora | 357/44 |
| 5,021,853 A | 6/1991 | Mistry | 357/23.13 |
| 5,038,214 A | 8/1991 | Miida | 358/213.11 |
| 5,055,418 A | 10/1991 | Vora | 437/31 |
| 5,117,292 A | 5/1992 | Matsunaga | 358/213.19 |
| 5,161,024 A | 11/1992 | Oishi | 358/213.24 |
| 5,227,887 A | 7/1993 | Dohi et al. | 358/213.27 |
| 5,241,575 A | 8/1993 | Miyatake et al. | 377/60 |
| 5,276,521 A | 1/1994 | Mori | 358/213.31 |
| 5,289,023 A | 2/1994 | Mead | 257/291 |
| 5,317,174 A | 5/1994 | Hynecek | 257/222 |
| 5,335,015 A | 8/1994 | Cooper et al. | 348/302 |
| 5,341,008 A | 8/1994 | Hynecek | 257/231 |
| 5,355,165 A | 10/1994 | Kosonocky et al. | 348/311 |
| 5,396,289 A | 3/1995 | Nakamura | 348/294 |
| 5,397,734 A | 3/1995 | Iguchi et al. | 437/70 |
| 5,414,464 A | 5/1995 | Sasaki | 348/222 |
| 5,414,465 A | 5/1995 | Kodama et al. | 348/236 |
| 5,414,683 A | 5/1995 | Tani | 369/47 |
| 5,424,223 A | 6/1995 | Hynecek | 437/3 |
| 5,428,390 A | 6/1995 | Cooper et al. | 348/240 |
| 5,434,620 A | 7/1995 | Higuchi et al. | 348/308 |
| 5,461,425 A | 10/1995 | Fowler et al. | 348/294 |
| 5,471,245 A | 11/1995 | Cooper et al. | 348/302 |
| 5,502,299 A | 3/1996 | Standley | 250/208.2 |
| 5,541,402 A | 7/1996 | Ackland et al. | 250/208.1 |
| 5,541,654 A | 7/1996 | Roberts | 348/301 |
| 5,547,881 A | 8/1996 | Wang et al. | 437/24 |
| 5,572,074 A | 11/1996 | Standley | 307/117 |
| 5,576,763 A | 11/1996 | Ackland et al. | 348/303 |
| 5,589,423 A | 12/1996 | White et al. | 437/228 |
| 5,625,210 A | 4/1997 | Lee et al. | 257/292 |
| 5,631,704 A | 5/1997 | Dickinson et al. | 348/308 |
| 5,668,596 A | 9/1997 | Vogel | 348/222 |
| 5,705,441 A | 1/1998 | Wang et al. | 438/384 |
| 5,712,682 A | 1/1998 | Hannah | 348/255 |
| 5,739,562 A | 4/1998 | Ackland et al. | 257/291 |
| 5,742,058 A | 4/1998 | Pantigny | 250/370.08 |
| 5,801,657 A | 9/1998 | Fowler et al. | 341/155 |
| 5,883,421 A | 3/1999 | Ben Chouikha et al. | 257/461 |
| 5,962,844 A * | 10/1999 | Merrill et al. | 250/208.1 |
| 6,046,444 A * | 4/2000 | Afghahi | 250/208.1 |
| 6,054,704 A * | 4/2000 | Pritchard et al. | 250/208.1 |
| 6,078,037 A * | 6/2000 | Booth, Jr. | 250/208.1 |
| 6,097,022 A * | 8/2000 | Merrill et al. | 250/208.1 |
| 6,111,245 A * | 8/2000 | Wu et al. | 250/208.1 |
| 6,115,066 A | 9/2000 | Gowda et al. | 348/308 |
| 6,211,510 B1 | 4/2001 | Merrill et al. | 250/208.1 |
| 6,246,436 B1 | 6/2001 | Lin et al. | 348/308 |
| 6,317,154 B2 * | 11/2001 | Beiley | 348/308 |

FOREIGN PATENT DOCUMENTS

| | | | |
|---|---|---|---|
| EP | 62143571 | 6/1987 | H04N/5/335 |
| EP | 01103378 | 4/1989 | H04N/5/335 |
| EP | 0 466 929 A1 | 1/1992 | H04N/5/238 |
| EP | 06133320 | 5/1994 | H04N/9/09 |
| EP | 0 605 898 A1 | 7/1994 | H01L/27/146 |
| EP | 08009391 | 1/1996 | H04N/9/04 |
| EP | 0707416 A2 | 4/1996 | H04N/3/15 |
| EP | 08095670 | 4/1996 | G06F/1/16 |
| EP | 09128091 | 5/1997 | G06F/1/00 |
| EP | 0 777 379 A1 | 6/1997 | H04N/3/15 |
| EP | 0 854 516 A2 | 7/1998 | H01L/27/146 |
| JP | 54-108628 | 8/1979 | G03B/7/20 |
| JP | 58-83824 | 5/1983 | G03B/7/20 |
| JP | 59-42527 | 3/1984 | G03B/17/14 |
| JP | 59-152424 | 8/1984 | G03B/7/20 |
| JP | 60-23841 | 2/1985 | G03B/17/14 |
| JP | 60-53912 | 3/1985 | G02B/7/11 |

OTHER PUBLICATIONS

Physics of Semiconductor Devices; Wiley–Interscience; Murray Hill, New Jersey; Bell Telephone Laboratories, Inc., S.M. SZE, 1969.

Abbas El Gamal, et al. "Modeling and Estimation of FPN Components in CMOS Image Sensors", Information Systems Laboratory, Stanford University, and Fudan University, Shanghai, China, pp. 1–10, (sometime after 1/98).

Albert J. P. Thuewissen, "Solid–State Imaging with Charge–Coupled Devices", Kluwer Academic Publishers, 1997, Chapter 5, pp. 131–141.

Alex Dickinson, et al., "TP 13.5 : A 256×256 CMOS Active Pixel Image Sensor With Motion Detection", IEEE International Solid–State Circuits Conference, 1995, pp. 226–227.

Andrew J. Blanksby, et al. "Noise Performance of a Color CMOS Photogate Image Sensor", IEEE, IEDM, 1997, pp. 202–204.

Bob Weibel, "High–End Digital Cameras Can Make Professional Indoor Photography A Snap", Buyer's Guide, Published Apr. 1997, pp. 71–78.

Carver A. Mead, et al. "Scanners For Visualizing Activity of Analog VLSI Circuitry", California Institute of Technology Computation and Neural Systems Program, Jul. 5, 1991, pp. 2–29.

Chye Huat Aw, et al. "A 128×128–Pixel Standard–CMOS Image Sensor With Electronic Shutter", IEEE International Solid–State Circuits Conference, 1996, pp. 4–39 to 4–40.

Don Sutherland, "Neaveau Niche–Part I, The Latest in Digital SLRs", Shutterbug, Nov. 1997, pp. 192, 193, 202, 208 & 210.

D. Knipp, et al. "Low Cost Approach to Realize Novel Detectors For Color Recognition", Forschungszentrum Julich GmbH, ISI–PV,(year unknown), pp. 350–353.

Eric R. Fossum, "Active Pixel Sensors: Are CCD's Dinosaurs?", SPIE vol. 1900, 7/93, pp. 2–14.

Guang Yang, et al. "A Snap–Shot CMOS Active Pixel Imager For Low–Noise, High–Speed Imaging", IEEE, 1998, pp. 45–48.

Hon–Sum Philip Wong, "CMOS Image Sensors–Recent Advances and Device Scaling Considerations", IEDM, 1997 IEE, pp. 201–204.

Hon–Sum Philip Wong, et al. "*CMOS Active Pixel Image Sensors Fabricated Using a 1.8–V, 0.25–µm CMOS Technology*", IEEE, Apr., 1998, pp. 889–894.

Hon–Sum Wong, et al. "*Technology and Device Scaling Considerations for CMOS Imagers*", IEEE Transactions on Electron Devices, vol. 43 No. 12, Dec. 1996, pp. 2131–2142.

Ken Parulski, et al. "*Enabling Technologies for a Family of Digital Cameras*", Eastman Kodak Company, SPIE vol. 2654, 1996, Invited Paper, pp. 156–163.

Mohamed Ben Chouikha, et al. "*Buried Triple p–n Junction Structure in a BiCMOS Technology for Color Detection*", IEEE BCTM 6.4, Sep. 1977 pp. 108–111.

Mohamed Ben Chouikha, et al. *Color Sensitive Photodetectors in Standard CMOS and BiCMOS Technologies*, SPIE vol. 2950, 1996, pp. 108–110.

Orly Yadid–Pecht, et al. "*A Random Access Photodiode Array for Intelligent Image Capture*", IEEE Transactions on Electron Devices, vol. 38, No. 8, Aug. 1991, pp. 1772–1780.

R. Daniel McGrath, et al. "*FA 11.2: Current–Mediated, Current–Reset 768×512 Active Pixel Sensor Array*", IEEE Digest of Technical Papers, Feb. 7, 1997, pp 182–183, 138–139.

R.M. Guidash, et al. "*A 0.6 µm CMOS Pinned Photodiode Color Imager Technology*", IEDM, 1997, pp 927–929.

R. Panicacci, "*1/4 Inch CMOS Active Pixel Sensor With Smart On–Chip Functions and Full Digital Interface, Part 1., Brief Introduction to CMOS Image Sensors*", Hot Chips IX, Aug. 25–26, 1997, pp. 41–53.

Savvas, G. Chamberlain, "*Photosensitivity and Scanning of Silicon Image Detector Arrays*" IEEE Journal of Solid–State Circuits, vol. SC–4, No. 6, Dec. 1969, pp. 333–342.

Stephen John Decker, "*A Wide Dynamic Range CMOS Imager with Parallel On–Chip Analog–to Digital Conversion*", Submitted to the Department of Electrical Engineering and Computer Science at Massachusetts Institute of Technology, Sep. 1997, pp. 3–205.

Sunetra K. Mendis, et al. "*A 128×128 CMOS Active Pixel Image Sensor for Highly Integrated Imaging Systems*", IEEE, 1993, pp. 583–586.

T. Delbruck et al, "*Analog VLSI Phototransduction by Continuous–time, Adaptive, Logarithmic Photoreceptor Circuits*", California Institute of Technology Computation and Neural Systems Program, CNS Memo No. 30, Apr. 2, 1996, pp. 1–24.

Tobi Delbruck, et al. "*Analog VLSI Adaptive, Logarithmic, Wide–Dynamic–Range Photoreceptor*", IEEE, May 1994, pp. 4 pages.

Tatsuo Nomoto, et al. "*FA 11.4: A 4M–Pixel CMD Image Sensor With Block and Skip Access Capability*", IEEE International Solid–State Circuits Conference, 1997, 6 pages.

Hiroki Miura, et al., "*A 100 Frame/s CMOS Active Pixel Sensor For 3D–Gesture Recognition System*", IEEE International Solid–State Circuits Conference, Jun. 1999, pp. 142–143.

Yoshiaki Hagiwara, "*High–Density and High–Quality Frame Transfer CCD Imager With Very Low Smear, Low Dark Current, and Very High Blue Sensitivity*", IEEE Transactions on Electron Devices, vol. 43, No. 12, Dec. 1996, pp. 2122–2130.

D. Renshaw, et al., "*ASIC Image Sensors*", IEEE, 1990, pp. 3038–3041.

Peter B. Denyer, et al., "*On–Chip CMOS Sensors For VLSI Imaging Systems*", VLSI 91, Proceedings of the IFIP TC 10/WG 10.5 International Conference on Very Large Scale Integration, Aug. 1991, pp. 4b.1.1 to 4b.2.1.

J.E.D Hurwitz, et al. "*An 800K–Pixel Color CMOS Sensor For Consumer Still Cameras*", SPIE vol. 3019, 1997, pp. 115–124.

Rudolph H. Dyck et al., "*Integrated Arrays of Silicon Photodetectors For Image Sensing*", IEEE Transactions on Electron Devices, vol. ED–15, No. 4, Apr. 1968, pp. 196–201.

Peter J. W. Noble, "*Self–Scanned Silicon Image Detector Arrays*", IEEE Transactions on Electron Devices, vol. ED–15, No. 4, Apr. 1968, pp. 202–208.

G. Sadasiv, et al., "*Thin–Film Circuits For Scanning Image–Sensor Arrays*", IEEE Transactions on Electron Devices, vol. ED–15, No. 4, Apr. 1968, pp. 215–219.

Thierry M. Bernard, "*Advanced Focal Plane Arrays and Electronic Cameras*", Proceedings EurOpt Series, vol. 2950, Oct. 1996, pp. 111–120.

S. Decker et al, "*A 256×256 CMOS Imaging Array With Wide Dynamic Range Pixels and Column–Parallel Digital Output*", IEEE International Solid–State Circuits Conf., 1998, pp. 176–177.

Orly Yadid–Pecht, et al. "A Random Access Photodiode Array for Intelligent Image Capture", IEEE Transactions on Electron Devices, vol. 38. No. 8, Aug. 1991, pp. 17721780.

\* cited by examiner

HIGH-SENSITIVITY STORAGE PIXEL SENSOR ARRAY HAVING AUTO-EXPOSURE DETECTION

RELATED APPLICATIONS

This application is a division of application Ser. No. 09/515,807, filed Feb. 29, 2000, assigned to the same assignee as the present invention.

BACKGROUND OF THE INVENTION

1. Field of the Invention

The present invention relates to digital cameras employing solid-state pixel sensors. More particularly, the present invention relates to solid-state pixel sensor arrays having improved sensitivity and auto-exposure detection apparatus for use in digital cameras.

2. The Prior Art

Storage pixel sensors are known in the art. These devices sense photo-integrated charge stored on a capacitor. A limitation of these prior pixels storage sensors is the tradeoff that results from the desire for the capacitor to be small to achieve high sensitivity and the competing desire for the capacitor to be large to provide low noise and good storage time.

Prior art exposure control techniques known to the inventors that use the actual image sensors during the actual exposure interval are of two types. Some prior art techniques integrate the total photocurrent by a common back-side electrode (anode) of a group of photodiodes—i.e., they integrate the substrate current to get an average light reading on the whole array. Other prior art techniques use nondestructive readout to sample selected pixels during the exposure interval, looking for an indication that some pixels are reaching a full-scale exposure. Another prior-art technique senses a total overflow charge from the pixel sensors.

The first technique is tricky and difficult to implement, since the photocurrents are small and the substrate is large and noisy. In addition, it responds strictly to the average light level across the image plane rather than to those pixels that are reaching a full-scale charge accumulation. The second technique requires a sequential polling, so is limited to either a very slow operation or to sensing only a very small subset of the pixels. The second technique is therefore not good for detecting the exact time when a small percentage of pixels are reaching a full-scale exposure. The third technique requires sensing of charges against a background of the total leakage of the full area of pixel sensors.

Other prior art techniques for exposure control typically measure the light either at a different time, e.g. just before the actual exposure, or with a different sensor device that needs to be calibrated relative to the sensor that is picking up the actual image. Such techniques typically sample the image plane at selected fixed points rather than adapting to the lighting conditions of the entire image.

One such prior art technique uses an imager first to estimate a light level and thereby to calculate an optimum exposure duration for a second cycle of the imager. This technique is obviously not as fast, and particularly is unsuited to controlling the exposure time rapidly during a dynamic lighting event, provided for example from a strobe flash.

Another such prior art technique employs a separate overall light sensor to measure an average light level and to react to a sufficient quantity of light by closing a shutter or quenching a strobe flash. Mechanical shutters and non-frame-storage electronic sensors cannot be shuttered rapidly enough to use this technique during a flash, which is why the detector is sometimes used to turn off the light source instead of closing a shutter. These techniques require an awkward coordination between the camera, the light sensor, and the light source, and do not necessarily track automatically the sensitivity (or film speed) and lens aperture of the camera.

Another type of prior art technique relates to use of an adjustable overflow drain for dynamic range enhancement. These techniques have not been integrated with the use of the overflow current for terminating the exposure time. Variations on this technique employ either a moving overflow barrier or a dual exposure interval to increase dynamic range.

BRIEF DESCRIPTION OF THE INVENTION

According to a first aspect of the present invention, an array of MOS active storage pixel sensors disposed on a semiconductor substrate is disclosed. Each pixel sensor in the array comprises a photodiode having a first terminal coupled to a first potential (ground) and a second terminal. A reset transistor hasing a first terminal coupled to the second terminal of the photodiode, a second terminal coupled to a reset reference potential that reverse biases the photodiode, and a control gate coupled to the reset line. A photocharge integration node comprises the gate of a first source-follower transistor having a drain, coupled to a first source-follower drain line, and a source. According to the present invention, the pixel sensor may comprise combinations of other elements in addition to the photodiode. Different embodiments of the invention employ one or more of a barrier transistor, a source-follower bias transistor, a transfer transistor, a saturation level transistor and an output amplifier transistor.

One embodiment of the present invention includes a barrier transistor having a first terminal coupled to the second terminal of the photodiode and a second terminal coupled to a photocharge integration node comprising the gate of the first source-follower transistor.

In another embodiment of the present invention, the first source-follower transistor is coupled to a bias current source and has an output. A bias transistor has its drain coupled to the output of the first source-follower transistor, its gate coupled to a fixed potential to establish the saturation level along with the fixed voltage on the gate of the saturation level transistor and a source coupled to a fixed voltage such as ground.

In another embodiment of the present invention, a semiconductor transfer transistor has a first terminal coupled to the output of the first source-follower transistor and a second terminal connected to a capacitive storage node comprising the control element of a second source-follower transistor having an output. A row-select transistor has a first terminal coupled to the output of the second source-follower transistor, a second main terminal coupled to a column output line and a control element coupled to a row-select line.

The separation of the photodiode from the charge integration node by the barrier transistor allows high sensitivity, and the separation of the storage node from the charge integration node by the first source-follower transistor allows low noise storage and readout by providing a smaller capacitance for the charge integration node and a larger capacitance for the storage node.

According to another aspect of the present invention in which the pixel sensors each employ a bias transistor, an auto-exposure circuit for use with pixel sensors is disclosed. A saturation level transistor has its source coupled to the output of the first source-follower amplifier, its gate coupled to a fixed potential chosen to turn the transistor on at a preselected pixel voltage representing a saturation level, and a common (global) current summing drain node. A bias transistor has its drain coupled to the output of the first source-follower amplifier, its gate coupled to a fixed potential to establish the saturation current and a source coupled to a fixed voltage such as ground. The global current summing node is coupled to a current comparator to compare the current flowing from the common drain node with a reference current. When the current from the global drain node exceeds the reference current, indicating that a preselected number of pixels in the array have saturated, the output of the comparator produces a TERMINATE EXPOSURE signal.

BRIEF DESCRIPTION OF THE DRAWING FIGURES

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure. For example, the illustrative embodiments of the present invention are disclosed using all N-Channel MOS transistor switches, but persons of ordinary skill in the art will appreciate that other technologies could be employed as well. Such skilled persons will readily understand how to adjust the polarities of the various potentials applied to the circuits disclosed herein to implement an embodiment of the present invention employing such other technologies.

The present invention encompasses various combinations of elements in storage pixel sensors. Different embodiments of storage pixel sensors according the present invention include one or more of the following elements in combination incorporated into the pixel sensor: a barrier transistor, a bias transistor for the source-follower transistor, a saturation level transistor, and a transfer transistor. The present invention is disclosed herein with reference to FIG. 1 as an embodiment including all of these elements in combination with disclosure of how each element functions in the combination, but persons of ordinary skill in the art will appreciate that multiple embodiments of the invention are contemplated having one or more of these elements in combination in a storage pixel sensor.

Figure 1:
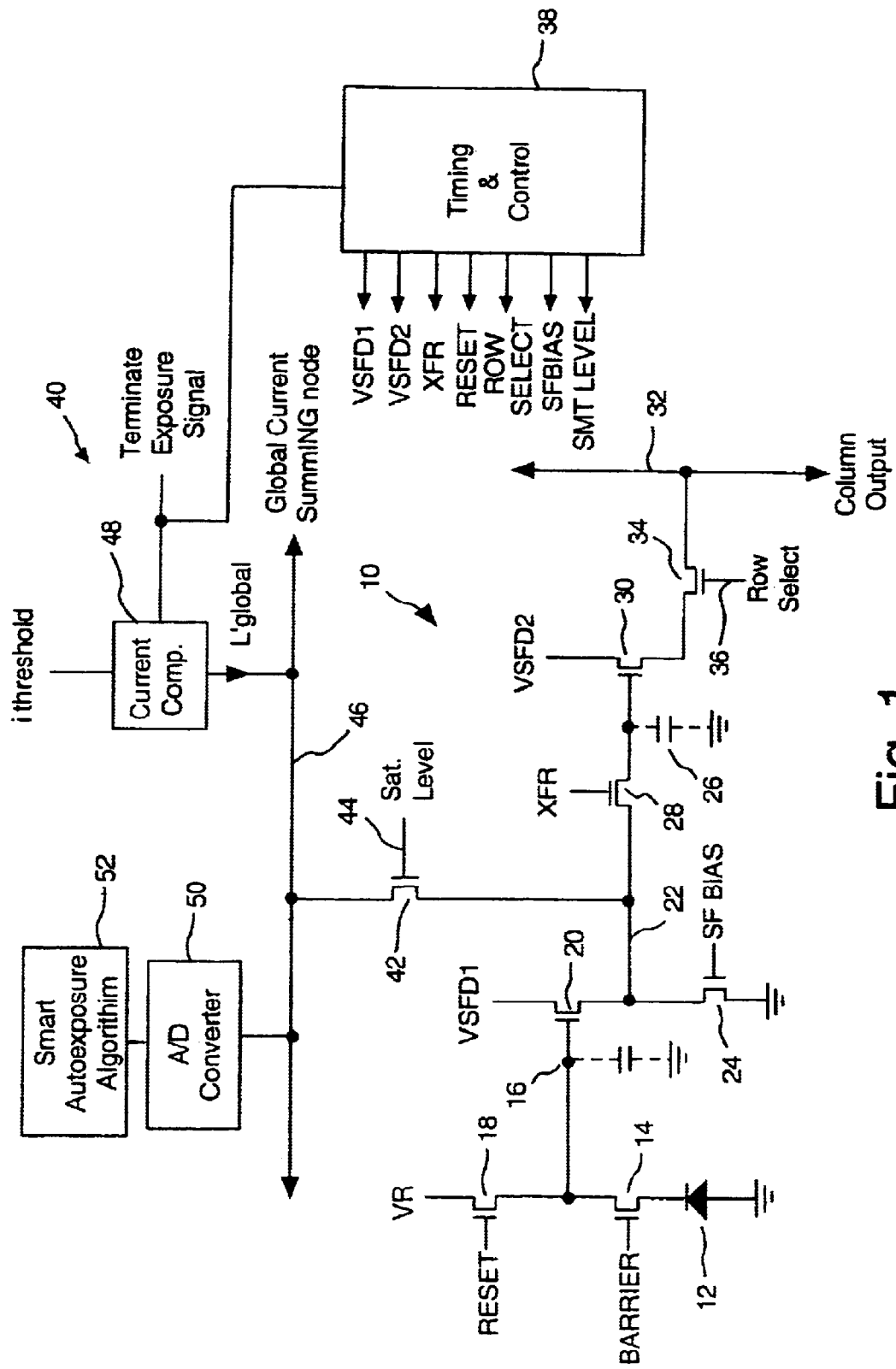
FIG. 1 is a schematic diagram of an illustrative MOS active pixel sensor incorporating an auto-exposure sensing circuit according to the present invention.

Referring first to FIG. 1, a schematic diagram of an illustrative high-sensitivity pixel sensor 10 incorporating an auto-exposure control according to the present invention is presented. Photodiode 12 has its anode coupled to a source of fixed potential (shown as ground) and a cathode. The cathode of photodiode 12 is coupled to the source of MOS N-Channel barrier transistor 14. The gate of MOS N-Channel barrier transistor 14 is coupled to a BARRIER line upon which a BARRIER control potential may be placed. Persons of ordinary skill in the art will appreciate that the use of MOS N-Channel barrier transistor 14 is optional in storage pixel sensor 10 of the present invention, at the cost of some sensitivity. Independent of the other transistors in the circuit, a barrier transistor 14 can be added to increase the sensitivity (the charge-to-voltage conversion gain) in darker areas of the image. The MOS N-Channel barrier transistor 14 allows essentially all of the charge from the photodiode to charge the gate capacitance of the first source follower transistor 20, providing a high gain, until that gate voltage falls low enough to turn the barrier transistor 14 on more, after which the storage pixel sensor 10 operates in the lower-gain mode (for lighter areas) in which the charge is charging both the photodiode capacitance and the gate capacitance.

The cathode of photodiode 12 is coupled to a photocharge integration node 16 (represented in FIG. 1 as a dashed line capacitor) through the MOS N-Channel barrier transistor 14. A MOS N-Channel reset transistor 18 has its source coupled to the photocharge integration node 16, its gate coupled to a RESET line upon which a RESET signal may be asserted, and its drain coupled to a reset potential VR.

The photocharge integration node 16 comprises the inherent gate capacitance of first MOS N-Channel source-follower transistor 20, having a drain connected to a voltage potential VSFD1. The voltage potential VSFD1 may be held fixed at a supply voltage V+ (which may be, for example, about 3–5 volts depending on the technology) or may be pulsed as will be disclosed further herein. The source of MOS N-Channel source-follower transistor 20 forms the output node 22 of the source-follower transistor and is coupled to the drain of MOS N-Channel bias transistor 24 operating as a current source. The source of MOS N-Channel bias transistor 24 is coupled to a fixed voltage potential such as ground. The gate of MOS N-Channel source-follower bias transistor 24 is connected to a bias voltage node. The voltage presented to the bias voltage node sets the bias current flowing through MOS N-Channel source-follower bias transistor 24. This voltage may be fixed, or, as will be disclosed further herein, may be pulsed to conserve power. The use of MOS N-Channel source-follower bias transistor 24 is optional in the present invention. As will be disclosed herein, this device is used in combination with a saturation level transistor to implement an auto-exposure detection function.

The output node 22 of the source-follower transistor is coupled to a capacitive storage node 26 (represented in FIG. 1 as a dashed line capacitor). In some embodiments of the present invention, the output node 22 of the source-follower transistor is coupled to the capacitive storage node 26 through a MOS N-Channel transfer transistor 28. The gate of MOS N-Channel transfer transistor 28 is coupled to a XFR line upon which a XFR signal may be asserted. MOS N-Channel transfer transistor 28 is an optional element in the storage pixel sensor of the present invention.

The capacitive storage node 26 comprises the inherent gate capacitance of second MOS N-Channel source-follower transistor 30, having a drain connected to a source-follower-drain (SFD) potential and a source. The source of second MOS N-Channel source-follower transistor 30 is coupled to COLUMN OUTPUT line 32 through MOS N-Channel row select transistor 34. The gate of MOS N-Channel row select transistor 34 is coupled to a ROW SELECT line 36.

Second MOS N-Channel source-follower transistor 30 is preferably a large device, having its gate sized at 10 to 100 times the area of first MOS N-Channel source-follower transistor 20. The other transistors in the circuit, first MOS N-Channel source-follower transistor 20, are preferably sized to near minimum length and width.

Use of a bias transistor 24 in the storage pixel sensor of the present invention can change the operating characteristics of the pixel sensor in a beneficial way. The first source-follower is working against a controlled current source, which may be more well controlled than when working against only the capacitive load of the storage node capacitance of the second source follower transistor 30.

To increase the input-to-output voltage gain of either source follower transistor 20 or 30, it is possible to pulse its drain terminal (as disclosed in FOV-013 for the readout follower). If the drain of the first source follower transistor 20 is pulsed, current will flow only when it is high, so the pixel saturation disclosed with reference to auto-exposure circuit 40 can be monitored only while it is high. It may be advantageous to pulse drain of the first source follower transistor 20 with a low duty cycle to save power during exposure. Pulsing drain of the first source follower transistor 20 also keeps the photodiode and barrier source/drain voltages lower during the time the drain is low, which can beneficially reduce voltage-dependent leakage at those nodes. If the BARRIER and VR voltages are adjusted for proper barrier operation with the drain low, then the barrier transistor 14 will tend to turn off while the drain of the first source follower transistor 20 is pulsed, so the charge on the photodiode 12 will not be disturbed. The exposure needs to end with the drain high to capture the final state on the storage node.

Referring now to FIG. 2A, a timing diagram illustrates the operation of pixel sensor 10 of FIG. 1. Initially, the RESET signal is asserted high. The VR node at the drain of the MOS N-Channel reset transistor 18 is brought from zero volts to the voltage VR. This action resets all pixel sensors in the array by placing the voltage potential VR (less a threshold of the MOS N-Channel barrier transistor 14) at the cathode of each photodiode 12. According to a presently preferred method for operating the high-sensitivity pixel sensor of the present invention illustrated in FIG. 2A, the voltage VR is initially at a low level (e.g., to zero volts) while RESET is high to reset the cathode voltages of all photodiodes in the array to a low value to quickly equalize their states to prevent image lag. Then the voltage VR is raised (e.g., to about 2 volts) for a predetermined time (preferably on the order of a few milliseconds) while the RESET signal is still asserted to allow the photodiodes in all pixel sensors to charge up to about 1.4 volts through their associated MOS N-Channel barrier transistors 14, whose gates are held at about 2 volts. The black level at the integration node is thus set to VR, less a little for the capacitive turn-off transient from the MOS N-Channel reset transistor, and the photodiodes are reset to their respective appropriate levels as determined by their respective barrier transistor thresholds. An advantage of this method is that those thresholds don't affect the black level that is read out. After reset ends and integration starts, some charge will still leak across the barrier by subthreshold conduction, but it should be about the same for all pixels, or at least be a monotonic function of light level.

According to a particularly advantageous operation of the storage pixels sensor of the present invention, the barrier transistor 14 and the reset transistor 18 are identically sized so as to exhibit identical voltage thrsholds (Vth). The active level of the RESET signal is chosen such that VRESET<VR+Vth, to achieve better tracking of nonlinearities.

When the RESET signal is de-asserted and photointegration begins, charge accumulates on the photocharge integration node 16. Because MOS N-Channel barrier transistor 14 is barely conducting, photoinduced charge trickles across its channel and charges photocharge integration node 16 (by lowering its voltage) without lowering the voltage on the cathode of the photodiode 12. This is advantageous because it minimizes the capacitance charged by the photocurrent, thereby maximizing the sensitivity (volts per photon).

Persons of ordinary skill in the art will appreciate that the MOS N-Channel reset transistor 18 can be coupled directly to the cathode of the photodiode 12, but such an arrangement requires that the voltage VR be set precisely relative to the barrier voltage and threshold. This is not preferred since the thresholds can vary.

The voltage at the source of first MOS N-Channel source-follower transistor 20, and hence its output node 22, follows the voltage on its gate (the photocharge integration node 16). In embodiments of the present invention that employ MOS N-Channel transfer transistor 28, the XFR signal is asserted throughout the reset period and the integration period and is de-asserted to end the integration period as illustrated in FIG. 2A. The low level of the XFR signal is preferrably set to zero or a slightly negative voltage, such as about −0.2 volts, to thoroughly turn off transfer transistor 28.

To read out a pixel sensor, the SFD node at the drain of the second MOS N-Channel source-follower transistor (labeled VSD2 in FIG. 2A) is driven to the voltage VSFD, the ROW SELECT signal for the row of the array containing the pixel sensor 10 is asserted, and the output signal is thereby driven onto COLUMN OUTPUT line 32. The timing of the assertion of the VSFD2 signal is not critical, except that it should remain high until after the ROW SELECT signal is de-asserted as illustrated in FIG. 2A. It may be advantageous to limit the voltage slope at the rising edge of the ROW SELECT signal if VSFD2 is rasied first, as disclosed in co-pending application Ser. No. 09/492,103, filed Feb. 14, 2000.

Referring now to FIG. 2B, if the XFR transistor is not present, the storage node may be isolated by lowering SFBIAS (preferably to zero or a slightly negative voltage such as about −0.2 volts) and setting VR low, and then asserting the RESET signal. This sequence turns off the first source follower 20 by lowering the voltage on its gate while its load current is turned off, thereby storing its output voltage.

In FIG. 2B, the VR falling edge and the RESET rising edge are shown following closely on the terminate signal, since these transistors isolate the storage node to end the exposure. In FIG. 1A, the corresponding transitions are shown with more delay since they are not critical when XFR falling isolates the storage node. The SFBIAS signal needs to fall only in the case of FIG. 2B; when there is a transfer transistor the bias can be steady.

Also shown in FIG. 2B is the signal VSFD1 to illustrate an embodiment of the present invention in which VSFD1 is pulsed. As disclosed herein, the VSFD1 node may always be left high, or, as shown in FIG. 2B VSFD1 may be pulsed thus saving power. In embodiments of the present invention in which VSFD1 is pulsed, terminate will become true during a pulse. VSFD1 is held high until RESET goes high or, in embodiments employing a transfer transistor, until XFR goes low.

Second MOS N-Channel source-follower transistor 30 is larger than first MOS N-Channel source-follower transistor 20, and its gate capacitance (the capacitive storage node 26) is therefore correspondingly larger. This provides the advantage of additional noise immunity for the pixel sensor 10 because more charge needs to be transferred to or from the capacitive storage node 26 to cause a given voltage change than is the case with the photocharge integration node 16.

The control signals depicted in FIGS. 2A and 2B may be generated using conventional timing and control logic. To this end, timing and control logic circuit 38 is shown in FIG. 1. The configuration of timing and control logic circuit 38 will depend on the particular embodiment of the present invention, but in any event will be conventional circuitry, the particular design of which is a trivial task for persons of ordinary skill in the art having examined FIGS. 2A and 2B once a particular embodiment of the present invention is selected.

Referring again to FIG. 1, an auto-exposure circuit 40 for use with pixel sensors according to a second aspect of the present invention is disclosed. According to this aspect of the invention, each pixel in the array includes a MOS N-Channel saturation level transistor 42, having its source coupled to the output node 22 of the first MOS N-Channel source-follower transistor 20, its gate coupled to SAT. LEVEL line 44, and its drain connected to a global current summing node 46. Global current summing node 46 is coupled to a current comparator 48. Persons of ordinary skill in the art will appreciate that current comparator 48 may comprise a diode load or a resistor coupled between a voltage source and global current summing node 46 driving one input of a voltage comparator. The other input of the voltage comparator would be coupled to a voltage representing a desired number of saturated pixels. Alternatively, an analog-to-digital converter may be used and the comparison may be done digitally.

A saturation level transistor 42 can be used, only if the bias transistor 24 is present, to divert the bias current from saturated pixel sensors onto a global current summing line that can be monitored during exposure to determine how many pixels have reached the saturation level. External circuits can control the threshold for what is deemed saturation, and can measure the current instead of just comparing it to a threshold, so it is possible through this added transistor and global current summing line to measure how many pixel sensors have crossed any particular level. Therefore, by performing rapid variation of the threshold (SAT. LEVEL) and rapid measurement (e.g. through an A/D converter and input to a processor), it is possible to have access to a complete cumulative histogram of exposure levels during the exposure; from this information, it is possible to make more complex determinations of good exposure levels, beyond the simple threshold method used in the presently preferred embodiment.

When the bias transistor 24 is present, isolating the storage node involves timing signals to turn off both the bias transistor 24 and the first source follower 20. It is simpler, and potentially advantageous in terms of storage integrity, to include a transfer transistor 28 that can isolate the storage node under control of a single logic signal. The transfer transistor 28 can also be added to the basic circuit, even without the bias transistor, for a similar advantage, since even turning off the first source follower transistor 20 reliably involves coordinating the Reset and VR signals, which is a complexity that can be eliminated with the transfer transistor 28.

In operation, the SAT. LEVEL line 44 is driven to a voltage VSAT corresponding to a selected photocharge saturation level. Because accumulation of photocharge drives the output node 22 of the first MOS N-Channel source-follower transistor 20 downward, MOS N-Channel saturation level transistor 42 is initially turned off because its gate voltage at VSAT is lower than the voltage at node 16. MOS N-Channel saturation level transistor 42 remains off until accumulation of photocharge at photocharge integration node 16 has lowered its voltage below VSAT (and that at the source of MOS N-Channel saturation level transistor 42, common to the output node 22 of the first MOS N-Channel source-follower transistor 20, to a level one Vt below the voltage VSAT). At this point, MOS N-Channel saturation level transistor 42 turns on and starts to draw current (less than or equal to the bias current through bias transistor 24) from the global current summing node 46.

As will be appreciated by persons of ordinary skill in the art, other pixel sensors in the array will also begin to accumulate enough photocharge to turn on their MOS N-Channel saturation level transistors 42, thus drawing additional current from node 46, and further dropping the voltage on global current summing node 46. As will be appreciated by persons of ordinary skill in the art, comparator 48 may be a voltage comparator having one input coupled to global current summing node 46 and one input coupled to a voltage VTERM chosen to correspond to the voltage on global current summing node 46 when a selected number of pixels are saturating (i.e., have their MOS N-Channel saturation level transistors 42 turned on). When the voltage on global current summing node 46 equals VTERM, the comparator 48 generates a TERMINATE EXPOSURE signal that can be used to terminate the exposure period in one of numerous ways, such as by closing a mechanical shutter or initiating end-of-exposure signals (such as the XFR signal) to control the pixel sensors. The TERMINATE EXPOSURE signal can also be used to quench a strobe flash if desired.

Alternatively, A/D converter 50 may be coupled to global current summing line 46 to convert the voltage representing the global summed current to a digital value that can be processed by employing a smart auto-exposure algorithm shown at reference numeral 52.

The auto-exposure circuit 40 of the present invention may be advantageously operated in a power saving mode by simultaneously pulsing both the VSFD1 signal to the drain of the source-follower transistor 20 and one or both of the SF bias signal supplied to the gate of source-follower bias transistor 24 and the SAT. LEVEL signal supplied to the gate of saturation level transistor 42. In such a mode, the auto-exposure sensing current flows only when these signals are pulsed, at which time the overexposure sensing is performed. At other times during photointegration, the overexposure currents from each pixel do not flow, thus saving power. When this mode of operation is used, the auto-exposure circuit 40 can be advantageously used at higher current levels for better signal-to-noise ratio.

According to another mode of operating the auto-exposure circuit 40 of the present invention, the SAT. LEVEL voltage at the gates of all saturation level transistors 42 in an array can be swept from zero to the maximum level do develop a full cumulative distribution of the states of all pixels in the array. This mode of operation is most useful when A/D converter 50 is used in the auto-exposure circuit 40. In embodiments of the present invention employing optional transfer transistor 28, this device should either be turned off before the ramping of SAT. LEVEL voltage each measurement cycle, or an extra cycle should be performed with the SAT. LEVEL voltage low in order to store a signal voltage that is not clipped to the variable SAT. LEVEL voltage. An example of an auto-exposure algorithm that could use this cumulative distribution information is one that would analyze the distribution and classify the scenes as being backlit or not, and set different values of SAT. LEVEL and i-threshold accordingly, during exposure.

Figure 3:
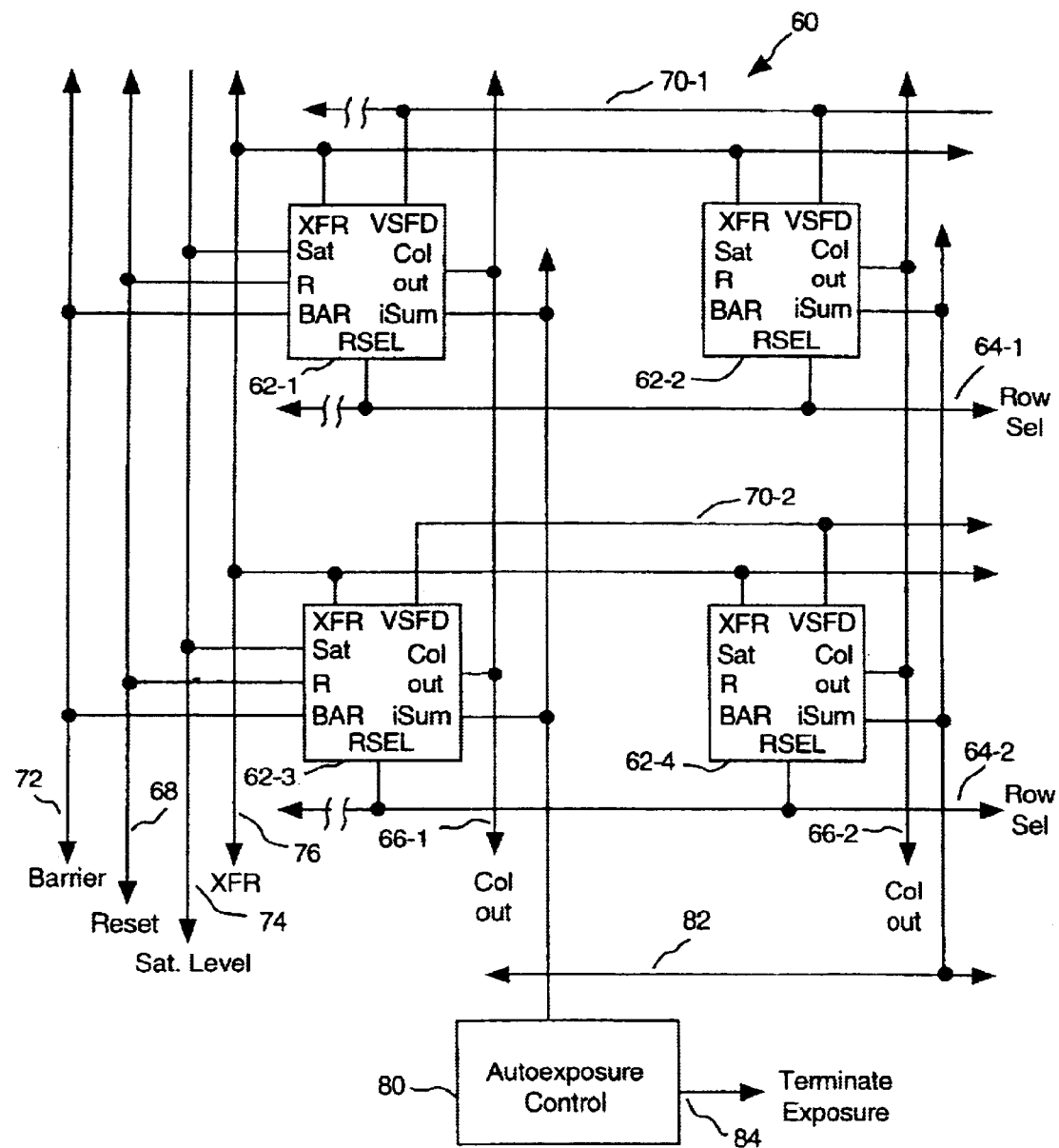
FIG. 3 is a block diagram of an illustrative array of MOS active pixel sensors and auto-exposure apparatus according to the present invention.

In a typical application of the MOS pixel sensor of the present invention, a plurality of such pixel sensors will be disposed in an array. Referring now to FIG. 3, a block diagram shows an illustrative 2 by 2 portion of an array of pixel sensors and auto-exposure apparatus according to the present invention. Persons of ordinary skill in the art will readily appreciate that the array portion disclosed in FIG. 3 is illustrative only and that arrays of arbitrary size may be fabricated using the teachings herein.

As would be expected by persons of ordinary skill in the art and as shown in FIG. 3, common RESET, BARRIER, SF BIAS, and SAT. LEVEL lines will be provided for all of the pixel sensors in the array. As presently preferred, a separate VSFD line is provided for each row in the array, although embodiments of the present invention having a single VSFD node are also contemplated. The source of each N-Channel MOS row select transistor in FIG. 1 for each pixel sensor in a column of the array will be coupled to a column line associated with that column and the gate of the N-Channel MOS row select transistor in FIG. 1 for each pixel sensor in a row of the array will be coupled to a ROW SELECT line associated with that row.

The 2 by 2 portion 60 of the array in FIG. 3 includes two rows and two columns of MOS active pixel sensors according to the present invention. A first row includes MOS active pixel sensors 62-1 and 62-2; a second row includes MOS active pixel sensors 62-3 and 62-4. A first column includes MOS active pixel sensors 62-1, 62-3; a second column includes MOS active pixel sensors 62-2 and 62-4.

A first ROW SELECT line 64-1 is connected to the row-select inputs (RSEL) of MOS active pixel sensors 62-1 and 62-2. A second ROW SELECT line 64-2 is connected to the row-select inputs (RSEL) of MOS active pixel sensors 62-3 and 62-4. The first and second ROW SELECT lines may be driven from a row decoder (not shown) as is well known in the art.

A first COLUMN OUTPUT line 66-1 is connected to the outputs (OUT) of MOS active pixel sensors 62-1 and 62-3. A second COLUMN OUTPUT line 66-2 is connected to the outputs (OUT) of MOS active pixel sensors 62-2 and 62-4. The first and second COLUMN OUTPUT lines are coupled to a column readout circuit (not shown) as is well known in the art.

A global RESET line 68 is connected to the reset (R) inputs of all of the MOS active pixel sensors 62-1 through 62-4. A first VSFD line 70-1 is connected to the VSFD inputs of the MOS active pixel sensors 62-1 and 62-2 in the first row of the array. A second VSFD line 70-2 is connected to the VSFD inputs of the MOS active pixel sensors 62-3 and 62-4 in the second row of the array. A global BARRIER line 72 is connected to the BARRIER inputs of all of the MOS active pixel sensors 62-1 through 62-4. A global SAT LEVEL line 74 is connected to the SAT LEVEL inputs of all of the MOS active pixel sensors 62-1 through 62-4. A global XFR line 78 is connected to the XFR inputs of all of the MOS active pixel sensors 62-1 through 62-4.

Auto-exposure circuit 80 is coupled to the GLOBAL CURRENT SUMMING LINE line 82 and generates a TERMINATE EXPOSURE signal on line 84 as described herein. The TERMINATE EXPOSURE signal on line 84 may be used to terminate the exposure of the image in a known manner, e.g., by closing a mechanical shutter, or electronically by causing the transition of the signals in FIG. 2 that isolate the storage node and/or quench a strobe flash.

Figure 2:
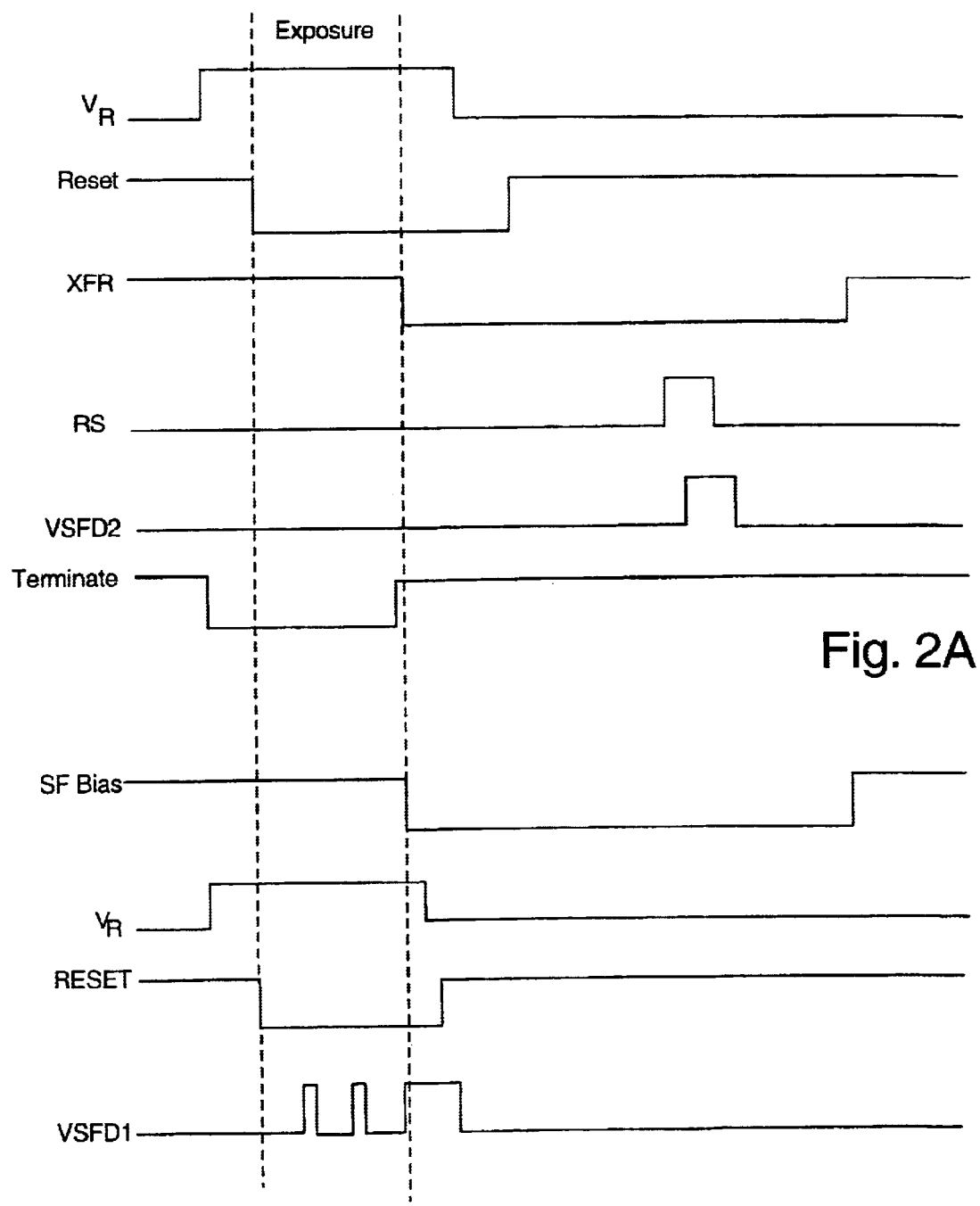
FIGS. 2A and 2B are timing diagrams that illustrate the operation of the pixel sensor of FIG. 1.

When the array including 2 by 2 portion 60 is driven by the signals shown in FIG. 2, images may be captured. One particular application of such an array is in a digital camera.

Figure 4:
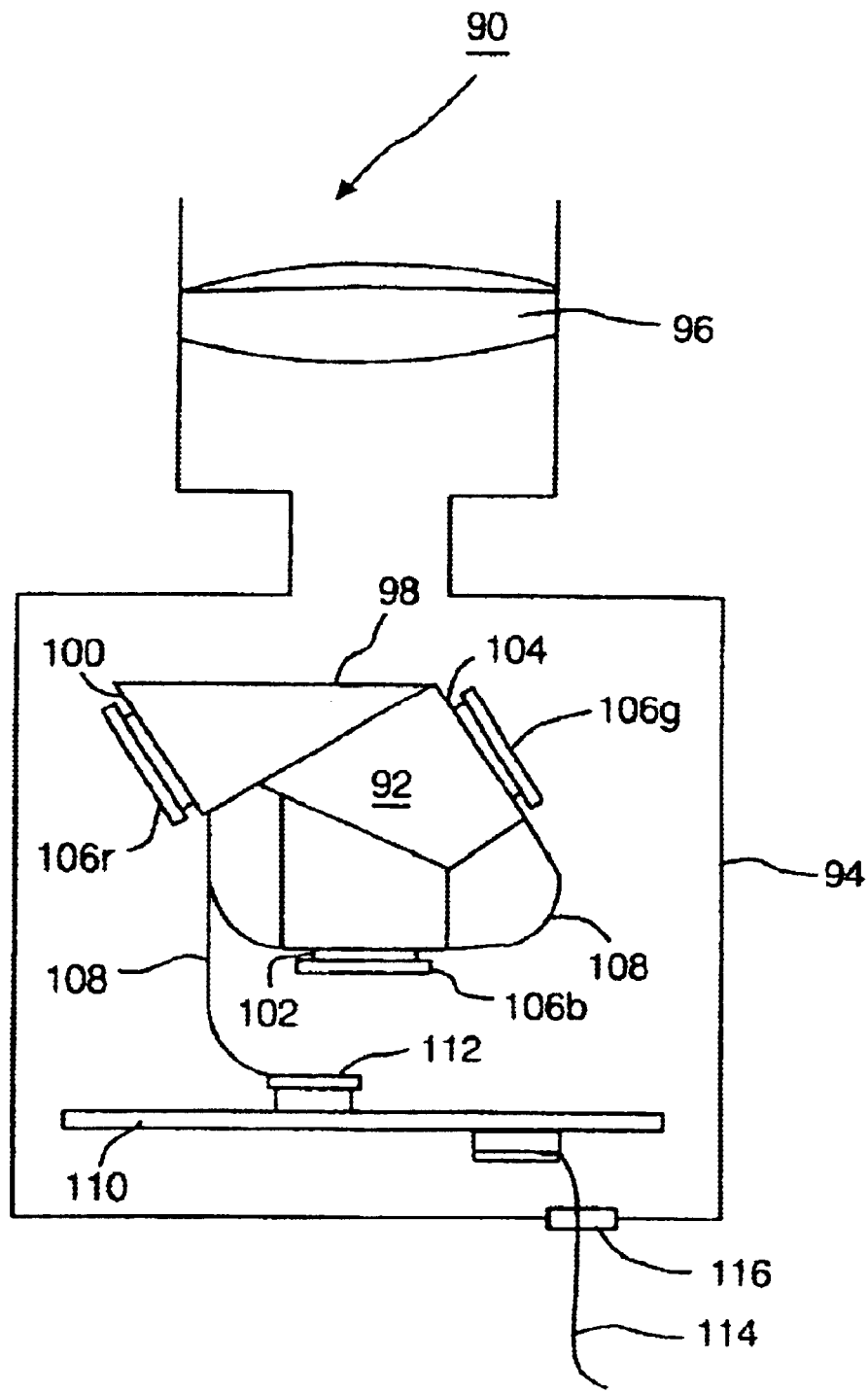
FIG. 4 is a diagram of an electronic camera including an array of pixel sensors and auto-exposure apparatus according to the present invention.

Referring now to FIG. 4, a block diagram of an illustrative digital camera 90 employing an array of MOS active pixel sensors and auto-exposure control according to the present invention is presented in schematic form. A color-separating prism 92 is shown mounted inside light-tight housing 94. Lens 96 is fitted to the housing in such a manner that it projects through the input face 98 of the prism 92, an image which is thereby split into red, green, and blue images, which are each focussed on one of output faces 100, 102, and 104 of prism 82.

Attached to the three output faces of prism 92 are three chip-on-board assemblies, labeled 106R, 106G, and 106B, aligned in such a way that the color-separated images fall on their active areas in registration. Each chip-on-board assembly includes an imaging array of pixel sensors like that partially depicted in FIG. 3 according to the present invention. Each of these arrays is attached to its respective prism face. One method for attaching these arrays to the prism faces is disclosed in co-pending application Ser. No. 09/302, 565, filed Apr. 30, 1999, expressly incorporated herein by reference.

Signal connections to the chip-on-board assemblies 106R, 106G, and 106B are made by way of a ribbon cable 108 which is fitted with three connectors that mate with connectors on the 3 chip-on-board assemblies. In addition, ribbon cable 98 is attached to a circuit board 110 by way of connector 112. Circuit board 110 comprises the support electronics for controlling the reading of image data from the three imaging arrays on the chip-on-board assemblies 106R, 106G, and 106B mounted on the prism 92 as is understood by those skilled in the art. Cable 114 carries power into camera 80, and carries out of the camera signals representative of the image captured through lens 86. Cable 114 exits housing 94 through light-tight fixture 116.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An integrated active pixel sensor array arranged in a plurality of rows and columns comprising:

a plurality of row select lines, each of said row select lines associated with one row in the array and coupled to a source of a row-select signal;

a plurality of column output lines, each of said column lines associated with one column in said array;

a reset line coupled to a source of reset potential;

a saturation level line coupled to a source of saturation level control voltage;

a global current-summing node;

a first source-follower drain line coupled to a first source-follower drain signal source;

a plurality of active pixel sensors, each pixel sensor associated with one row and one column of the array and including a photodiode having a first terminal coupled to a first potential and a second terminal, a reset transistor having a first terminal coupled to the second terminal of the photodiode, a second terminal coupled to a reset reference potential that reverse biases the photodiode, and a control gate coupled to said reset line, a photocharge integration node coupled to said second terminal of said photodiode, said photocharge integration node comprising the gate of a first source-follower transistor, said first source-follower transistor having a drain, coupled to said first source-follower drain line, and a source, means for generating a bias current at said source of said first source follower transistor, and an exposure transistor having a source coupled to said source of said first source-follower transistor and a drain coupled to said global current-summing node, said exposure transistor having a control gate coupled to said saturation level line.

2. The integrated active pixel sensor array of claim 1 further including means for selectively pulsing said first source-follower drain signal source.

3. The integrated active pixel sensor array of claim 1 further including a second source-follower drain line coupled to a second source-follower drain signal source and wherein each of said plurality of active pixel sensors further includes a second source-follower transistor having a drain coupled to said second source-follower drain line, a gate forming a capacitive storage node, and a source.

4. The integrated active pixel sensor array of claim 3 further including means for selectively pulsing said second source-follower drain signal source.

5. The integrated active pixel sensor array of claim 1 further including a bias voltage node coupled to a source of bias voltage and wherein said means for generating a bias current in each of said plurality of active pixel sensors comprises a bias transistor having a source coupled to a fixed voltage source, a gate coupled to a bias voltage node and a drain coupled to the source of said first source-follower transistor.

6. The integrated active pixel sensor array of claim 5 wherein the gate of said bias transistor in each of said plurality of active pixel sensors is coupled to a bias voltage node that may be selectively pulsed.

7. The integrated active pixel sensor array of claim 1 wherein each of said plurality of active pixel sensors further includes a barrier transistor having first and second terminals coupled between the second terminal of said photodiode and said first terminal of said reset transistor, said barrier transistor having a control terminal coupled to a barrier set voltage.

8. The integrated active pixel sensor array of claim 7 wherein said reset transistor and said barrier transistor in each of said plurality of active pixel sensors are sized so as to have substantially matched voltage thresholds.

9. The integrated active pixel sensor array of claim 1 further including a transfer line coupled to a source of a transfer signal, and wherein each of said plurality of active pixel sensors further comprises a transfer transistor disposed between said source of said first source-follower transistor and said capacitive storage node, said transfer transistor having a first terminal coupled to said first source-follower transistor, a second terminal coupled to said capacitive storage node and a control gate coupled to said transfer line.

10. The integrated active pixel sensor array of claim 5 further including a transfer line coupled to a source of a transfer signal, and wherein each of said plurality of active pixel sensors further comprises a transfer transistor disposed between said source of said first source-follower transistor and said capacitive storage node, said transfer transistor having a first terminal coupled to said source of said first source-follower transistor, a second terminal coupled to said capacitive storage node and a control gate coupled to said transfer line.

11. The integrated active pixel sensor array of claim 7 further including a transfer line coupled to a source of a transfer signal, and wherein each of said plurality of active pixel sensors further comprises a transfer transistor disposed between said source of said first source-follower transistor and said capacitive storage node, said transfer transistor having a first terminal coupled to said source of said first source-follower transistor, a second terminal coupled to said capacitive storage node and a control gate coupled to said transfer line.

12. The integrated active pixel sensor array of claim 3 wherein:
   each of said plurality of active pixel sensors further comprises a row-select transistor having a first terminal coupled to said source of said second source-follower transistor, a second terminal coupled to the one of said plurality of column output lines with which its active pixel sensor is associated, and a control gate coupled to the one of said plurality of row-select lines with which its active pixel sensor is associated; and
   said integrated active pixel sensor array further includes a control circuit for selectively activating a reset signal on said reset line and a row-select signal on each of said plurality of row-select lines.

13. The integrated active pixel sensor array of claim 5 wherein:
   each of said plurality of active pixel sensors further comprises a row-select transistor having a first terminal coupled to said source of said second source-follower transistor, a second terminal coupled to the one of said plurality of column output lines with which its active pixel sensor is associated, and a control gate coupled to the one of said plurality of row-select lines with which its active pixel sensor is associated; and
   said integrated active pixel sensor array further includes a control circuit for selectively activating a reset signal on said reset line and a row-select signal on each of said plurality of row-select lines.

14. The integrated active pixel sensor array of claim 7 wherein:
   each of said plurality of active pixel sensors further comprises a row-select transistor having a first terminal coupled to said source of said second source-follower transistor, a second terminal coupled to the one of said plurality of column output lines with which its active pixel sensor is associated, and a control gate coupled to the one of said plurality of row-select lines with which its active pixel sensor is associated; and
   said integrated active pixel sensor array further includes a control circuit for selectively activating a reset signal on said reset line and a row-select signal on each of said plurality of row-select lines.

15. The integrated active pixel sensor array of claim 9 wherein:
   each of said plurality of active pixel sensors further comprises a row-select transistor having a first terminal coupled to said source of said second source-follower transistor, a second terminal coupled to the one of said plurality of column output lines with which its active pixel sensor is associated, and a control gate coupled to the one of said plurality of row-select lines with which its active pixel sensor is associated; and said integrated active pixel sensor array further includes a control circuit for selectively activating a reset signal on said reset line, a transfer signal on said transfer line, and a row-select signal on each of said plurality of row-select lines.

16. An integrated active pixel sensor array arranged in a plurality of rows and columns comprising:

a plurality of row select lines, each of said row select lines associated with one row in the array and coupled to a source of a row-select signal;

a plurality of column output lines, each of said column lines associated with one column in said array;

a reset line coupled to a source of reset potential;

a barrier set voltage line coupled to a source of barrier set voltage;

a global current-summing node;

a first source-follower drain line coupled to a first source-follower drain signal source;

a second source-follower drain line coupled to a second source-follower drain signal source;

a plurality of active pixel sensors, each pixel sensor associated with one row and one column of the array and including a photodiode having a first terminal coupled to a first potential and a second terminal, a barrier transistor having a first terminal coupled to the second terminal of the photodiode, said barrier transistor having a second terminal and a control gate coupled to said barrier set voltage line, a reset transistor having a first terminal coupled to the second terminal of the barrier transistor, a second terminal coupled to a reset reference potential that reverse biases the photodiode, and a control gate coupled to said reset line, a photocharge integration node coupled to said second terminal of said barrier transistor, said photocharge integration node comprising the control gate of a first source-follower transistor, said first source-follower transistor having a drain coupled to said first source-follower drain line and a source coupled to a source of an exposure transistor and a source coupled to a source of an exposure transitor, said exposure transistor having a drain coupled to said global current-summing node and a control gate coupled to a saturation level line, a second source-follower transistor having a gate comprising a capacitive storage node and coupled to said source of said first source-follower transistor, a drain coupled to said second source-follower drain line, and a source.

17. The integrated active pixel sensor array of claim 16 including means for selectively pulsing said first source-follower drain signal source.

18. The integrated active pixel sensor array of claim 16 including means for selectively pulsing said second source-follower drain signal source.

19. The integrated active pixel sensor array of claim 16 further including:

a bias voltage node coupled to a source of bias voltage;

wherein each of said active pixel sensors further includes:

a bias transistor having a source coupled to a fixed voltage source, a gate coupled to said bias voltage node and a drain coupled to the source of said first source-follower transistor.

20. The integrated active pixel sensor array of claim 19 further including means for selectively pulsing said bias voltage node.

21. The integrated active pixel sensor array of claim 16 wherein said reset transistor and said barrier transistor in each of said active pixel sensors are sized so as to have substantially matched voltage thresholds.

22. The integrated active pixel sensor array of claim 16 further including a transfer line coupled to a source of a transfer signal, and wherein each of said plurality of active pixel sensors further comprises a transfer transistor disposed between said source of said first source-follower transistor and said capacitive storage node, said transfer transistor having a first terminal coupled to said source of said first source-follower transistor, a second terminal coupled to said capacitive storage node and a control gate coupled to said transfer line.

23. The integrated active pixel sensor array of claim 22 further including:

a bias voltage node coupled to a source of bias voltage;

wherein each of said active pixel sensors further includes:

a bias transistor having a source coupled to a fixed voltage source, a gate coupled to said bias voltage node and a drain coupled to the source of said first source-follower transistor.

24. The integrated active pixel sensor array of claim 16 wherein:

each of said plurality of active pixel sensors further comprises a row-select transistor having a first terminal coupled to said source of said second source-follower transistor, a second terminal coupled to the one of said plurality of column output lines with which its active pixel sensor is associated, and a control gate coupled to the one of said plurality of row-select lines with which its active pixel sensor is associated; and said integrated active pixel sensor array further includes a control circuit for selectively activating a reset signal on said reset line and a row-select signal on each of said plurality of row-select lines.

25. The integrated active pixel sensor array of claim 19 wherein:

each of said plurality of active pixel sensors further comprises a row-select transistor having a first terminal coupled to said source of said second source-follower transistor, a second terminal coupled to the one of said plurality of column output lines with which its active pixel sensor is associated, and a control gate coupled to the one of said plurality of row-select lines with which its active pixel sensor is associated; and said integrated active pixel sensor array further includes a control circuit for selectively activating a reset signal on said reset line and a row-select signal on each of said plurality of row-select lines.

26. The integrated active pixel sensor array of claim 22 wherein:

each of said plurality of active pixel sensors further comprises a row-select transistor having a first terminal coupled to said source of said second source-follower transistor, a second terminal coupled to the one of said plurality of column output lines with which its active pixel sensor is associated, and a control gate coupled to the one of said plurality of row-select lines with which its active pixel sensor is associated; and said integrated active pixel sensor array further includes a control circuit for selectively activating a reset signal on said reset line, a transfer signal on said transfer line, and a row-select signal on each of said plurality of row-select lines.

27. The integrated active pixel sensor array of claim 22 wherein:

each of said plurality of active pixel sensors further comprises a row-select transistor having a first terminal coupled to said source of said second source-follower transistor, a second terminal coupled to the one of said plurality of column output lines with which its active pixel sensor is associated, and a control gate coupled to the one of said plurality of row-select lines with which its active pixel sensor is associated; and said integrated active pixel sensor array further includes a control circuit for selectively activating a reset signal on said reset line, a transfer signal on said transfer line, and a row-select signal on each of said plurality of row-select lines.

\* \* \* \* \*